US010072960B2

(12) United States Patent
Muzzo et al.

(10) Patent No.: US 10,072,960 B2
(45) Date of Patent: Sep. 11, 2018

(54) CAPACITIVE LEVEL GAUGE ASSEMBLY FOR A CONTAINER OF PRESSURISED OR LIQUIFIED GAS

(71) Applicant: LUXEMBOURG PATENT COMPANY S.A., Lintgen (LU)

(72) Inventors: Paul Muzzo, Yutz (FR); Isabelle Schmitz, Bridel (LU)

(73) Assignee: LUXEMBOURG PATENT COMPANY S.A., Lintgen (LU)

( * ) Notice: Subject to any disclaimer, the term of this patent is extended or adjusted under 35 U.S.C. 154(b) by 127 days.

(21) Appl. No.: 14/403,459

(22) PCT Filed: Jun. 6, 2013

(86) PCT No.: PCT/EP2013/061725
§ 371 (c)(1),
(2) Date: Nov. 24, 2014

(87) PCT Pub. No.: WO2013/182649
PCT Pub. Date: Dec. 12, 2013

(65) Prior Publication Data
US 2015/0114106 A1  Apr. 30, 2015

(30) Foreign Application Priority Data

Jun. 8, 2012  (LU) .......................................... 92018

(51) Int. Cl.
*G01F 23/26* (2006.01)
(52) U.S. Cl.
CPC .......... *G01F 23/263* (2013.01); *G01F 23/268* (2013.01)
(58) Field of Classification Search
CPC ...... G01F 23/26–23/268; F17C 13/021; F17C 2250/0417; G01N 27/226
(Continued)

(56) References Cited

U.S. PATENT DOCUMENTS 2,802,975 A * 8/1957 Weber, Jr. ............. G01F 23/268
361/284
2,941,403 A   6/1960 Steenfeld et al.
(Continued)

FOREIGN PATENT DOCUMENTS

DE      19728280 A1   5/1998
DE      20313695 U1   12/2003

OTHER PUBLICATIONS

Burndy, Compression Connections, Apr. 30, 2013, WaybackMachine Archived version.*

(Continued)

*Primary Examiner* — Daniel S Larkin
*Assistant Examiner* — David L. Singer
(74) *Attorney, Agent, or Firm* — Cantor Colburn LLP

(57) ABSTRACT

A capacitive level gauge assembly for a pressurized or liquefied gas container comprises a body with a base capable of being fitted in an opening of said container and an electrical circuit arranged in the body; electrode-carrying means are fitted in leakproof manner in said body and connected to said electrical circuit, said electrode-carrying means being configured to support two electrodes fixedly with an annular measurement space therebetween. The electrode-carrying means comprise a metallic support fitted in leakproof manner in the valve body and electrically insulated therefrom, the first electrode being fixed to said metallic support, and the metallic support being connected to the electrical circuit. The metallic support comprises at its free end a coupling means for the first electrode.

12 Claims, 4 Drawing Sheets

(58) Field of Classification Search
USPC .................. 73/304 C; 324/690; 702/52, 55; 361/284; 340/620; 33/366.19
See application file for complete search history.

(56) References Cited

U.S. PATENT DOCUMENTS

| | | | | |
|---|---|---|---|---|
| 3,477,290 A * | 11/1969 | Lerner | ............. | G01F 23/268 361/284 |
| 3,747,407 A * | 7/1973 | Wallman | ............. | G01F 23/263 331/113 R |
| 3,831,069 A * | 8/1974 | Merrell | ............. | H01G 4/04 361/272 |
| 4,083,248 A * | 4/1978 | Maier | ............. | G01F 23/266 73/304 C |
| 4,170,135 A * | 10/1979 | Booman | ............. | G01F 23/284 73/290 R |
| 4,296,472 A * | 10/1981 | Sarkis | ............. | G01F 1/007 701/123 |
| 4,314,478 A * | 2/1982 | Beaman | ............. | G01F 23/268 361/278 |
| 4,449,405 A * | 5/1984 | Franz | ............. | G01F 23/263 324/690 |
| 4,499,641 A * | 2/1985 | Fleckenstein | ......... | G01F 23/266 264/262 |
| 4,568,873 A * | 2/1986 | Oyanagi | ............. | G01B 7/14 324/627 |
| 4,745,893 A * | 5/1988 | Atherton | ............. | G01F 23/263 123/196 S |
| 4,757,252 A * | 7/1988 | Maltby | ............. | G01R 27/2635 324/687 |
| 4,977,528 A * | 12/1990 | Norris | ............. | G01F 23/263 340/612 |
| 5,481,197 A * | 1/1996 | Sanders | ............. | F17C 13/021 324/690 |
| 5,701,932 A | 12/1997 | Bourscheid et al. | | |
| 5,955,684 A * | 9/1999 | Gravel | ............. | G01F 23/268 73/866.5 |
| 6,148,681 A * | 11/2000 | Gravel | ............. | G01F 23/268 73/866.5 |
| 6,642,807 B1 * | 11/2003 | Gard | ............. | G01F 23/268 333/24 R |
| 2003/0233875 A1 * | 12/2003 | Stehman | ............. | G01F 23/263 73/304 C |
| 2005/0150568 A1 * | 7/2005 | Dietmeier | ............. | G01F 23/00 141/95 |
| 2007/0169544 A1 * | 7/2007 | Yamamoto | ......... | G01N 25/005 73/61.41 |
| 2008/0038153 A1 * | 2/2008 | Yamamoto | ......... | G01F 23/268 422/82.12 |
| 2011/0199103 A1 | 8/2011 | Osswald et al. | | |

OTHER PUBLICATIONS

International Standard 60352-2, Solderless connections, Feb. 2006.*
Merriam—Webster dictionary definition of fixed.*
Written Opinion dated Dec. 9, 2014 re: PCT/EP2013/061725; citing: DE 197 28 280 A1, US 2011/199103 A1, DE 203 13 695 U1, US 2005/150568 A1, U.S. Pat. No. 2,941,403 A and U.S. Pat. No. 5,701,932 A.
International Search Report dated Nov. 27, 2013 re: PCT/EP2013/061725; re: PCT/EP2013/061725; citing: DE 197 28 280 A1, US 2011/199103 A1, DE 203 13 695 U1, US 2005/150568 A1, U.S. Pat. No. 2,941,403 A and U.S. Pat. No. 5,701,403 A.

* cited by examiner

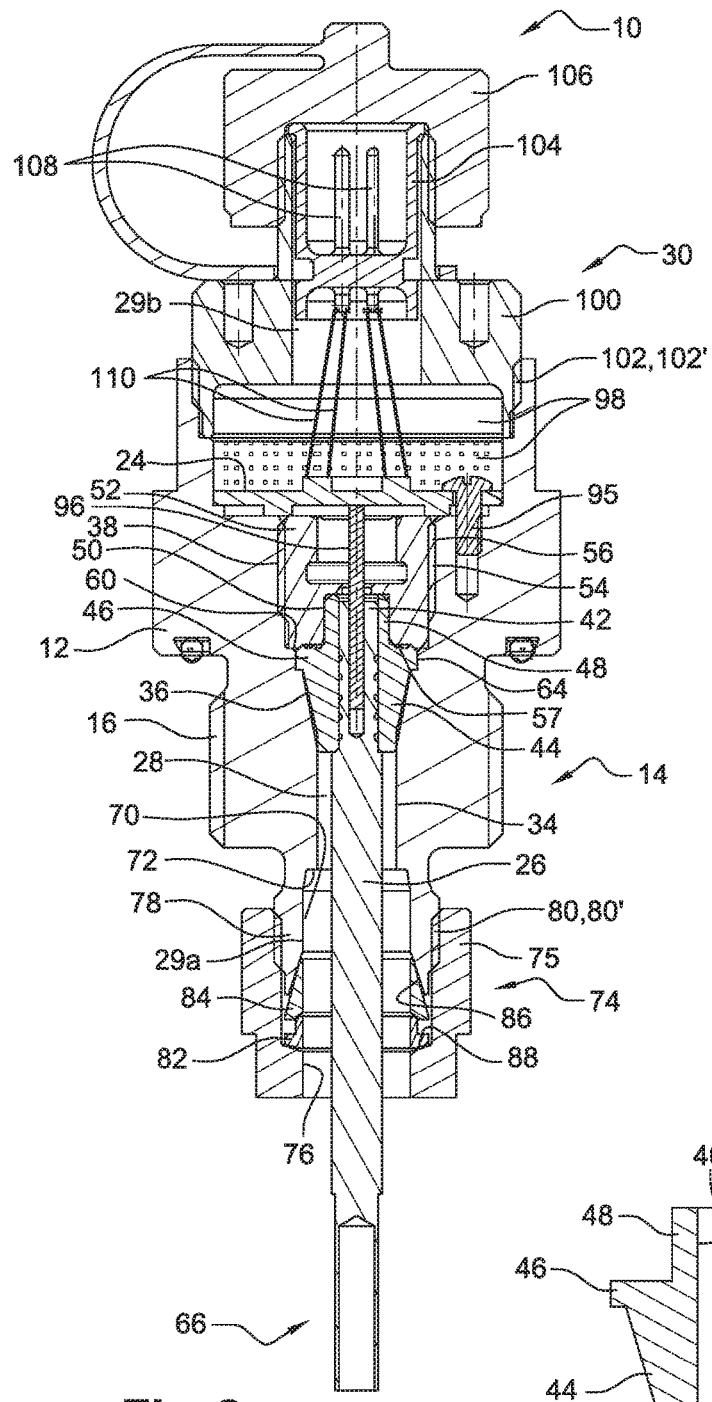
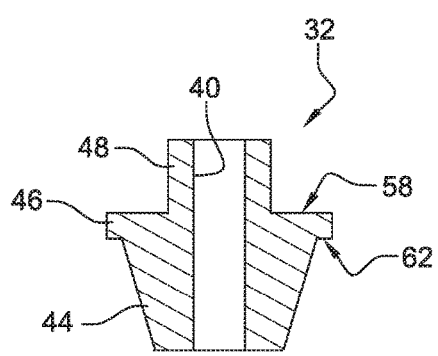
Fig. 2
Fig. 3

CAPACITIVE LEVEL GAUGE ASSEMBLY FOR A CONTAINER OF PRESSURISED OR LIQUIFIED GAS

TECHNICAL FIELD

The present invention relates in general to the field of level gauges for a pressurised or liquefied gas container, and more particularly to a level gauge assembly of the capacitive type.

BACKGROUND OF THE INVENTION

A gauge of this type, incorporated into a valve, is described for example in EP 0,709,656. The gauge consists of an elongate rod and of a cylindrical tube coaxially surrounding said rod, the tube and the rod being borne by the body of the valve and extending over the entire height of the container. The external tube electrode is borne directly by the base, into which it is screwed. The central electrode, a solid rod, is supported by the external electrode and by gaskets to ensure electrical insulation. Struts are distributed along the rod to maintain a constant measurement space between the two electrodes. This is because the measurement principle of such a gauge is based on the variation in capacitance measured between the electrodes as a function of the level of fluid in the inter-electrode space and thus in the container.

Though such a capacitive gauge design has proven itself in practice, it does have a number of disadvantages. The electrode requires meticulous fixing, then function and leak testing, meaning that the electrodes have to be factory-fitted. The consequence is that the device is then bulky, in particular from the point of view transport thereof, in particular when the electrodes are long.

BRIEF SUMMARY

The disclosure proposes a capacitive level gauge which is of more robust design and is more flexible in implementation.

More particularly, a capacitive level gauge assembly for pressurised or liquefied gas containers is provided, comprising:

a body with a base capable of being fitted in an opening of said container;

a pair of capacitive electrodes dimensioned to extend into the container, preferably from the base of the body and over the height of the container, the pair of electrodes comprising a first inner electrode and a second tubular electrode surrounding the first electrode, preferably concentrically;

an electrical circuit arranged in the body and connected to the electrodes.

Electrode-carrying means are fitted in leakproof manner in the body and connected to the electrical circuit, said electrode-carrying means being configured to support the two electrodes firmly with a measurement space therebetween. It will be appreciated that the electrode-carrying means comprise a metallic support fitted in leakproof manner in the valve body and electrically insulated therefrom, the first electrode being fixed to the metallic support, and the metallic support being connected to the electrical circuit.

The gauge assembly according to the invention is designed such that the body with the electrode-carrying means forms a leakproof, electrically connected module (body module), to which it is sufficient to fix the measurement electrodes to make the gauge operational. This is because the metallic support is fitted in leakproof manner in the body and electrically insulated from the remainder of the body. The inner electrode is then fixed, or coupled, to the metallic support by any appropriate means.

Such a design of the gauge body as a ready-to-use module has numerous practical advantages:

assembly of the gauge body with the electrode support means fitted in leakproof manner is performed in the factory, together with leak testing. It is therefore possible to test this module without the measurement electrodes, so simplifying the test procedure.

electrodes of any size may be fixed to the electrode body module without any effect on the leakproof nature of the body module. Since the electrodes are not fixed in a critical zone, the customer itself can fix the electrodes to the body module.

packaging of the gauge, for transport, is also simplified. The body module may be individually packaged, in appropriate packaging. The electrodes are packaged as simple tubes; it is also possible to deliver with each body module a set of several pairs of measurement electrodes of different lengths. The present gauge therefore makes logistics more flexible.

It will therefore be understood that the present invention also provides such a gauge assembly, but without the electrodes fixed to the electrode-carrying means.

Preferably, the fixing means for the second electrode surrounds the metallic support. For ease of access, the metallic support of the first electrode extends, viewed in the longitudinal axis of the electrodes, beyond the fixing means of the second electrode. The first electrode may be a solid rod or a hollow tube.

The first electrode is fixed to the metallic support in any suitable manner, for example by crimping, screwing or welding. In this context, any sort of geometry may be used for the coupled or in-contact parts of the metallic support and of the first electrode.

Preferably, the body comprises an internal through-passage extending from an orifice in the base of the body to another orifice in the upper part of the body; and the electrode-carrying means are arranged in the region of the base of the body, the metallic support of the first electrode being partially arranged in said through-passage.

The metallic support is preferably of an elongate cylindrical shape and is held in the through-passage by means of a sealing gasket preventing gas from passing downstream of the gasket.

According to a preferred embodiment, the metallic support comprises a foot or end portion received in a channel in the gasket. For its part, the gasket is arranged in a flared transitional section and has a flared portion, the external profile of which is adapted to this transitional section, preferably frustoconical. To hold the gasket, and therefore the electrode well, and to achieve good leakproofness, the gasket is compressed by a fitting part positioned in a downstream section of the transitional zone and resting on a rear shoulder of the gasket at the base of the flared portion thereof.

The second, outer electrode, is advantageously fixed directly to the terminal part of the base, also effecting earthing. The second electrode is for example inserted into a terminal part of the body through which the passage passes, preferably abutting against a shoulder. The second electrode may thus be held in position by clamping or friction, for example by means of a compression joint system or any other suitable mechanism.

For good measurement precision, struts are placed in the measurement space between the two electrodes. Different strut geometries/configurations may be envisaged, these preferably being of an electrically insulating synthetic material having a suitable dielectric strength.

It is possible to use annular (for example toroidal) gaskets or ring segments, preferably accommodated in annular grooves provided at various positions along the inner electrode (preferred in the case of a solid electrode). It is also possible to use annular spacers of rectangular section positioned at the surface of the first electrode, without a groove, optionally comprising a peg engaging in a hole in the first electrode for improved axial retention. Another type of strut comprises an annular base resting on the inner electrode, from which a number of radial arms extend; the space between the radial arms allows passage of the fluid in the axial direction in the measurement space.

To facilitate the penetration of fluid into the inter-electrode space and along the electrodes, the outer electrode may comprise holes distributed over its length. It is also possible to provide transverse holes in the central electrode.

It will be noted that in the principle of modular design of the gauge body, the latter preferably comprises a minimum level of onboard electronics. The electrical circuit incorporated into the body may for example comprise a programmable read-only memory (of the EEPROM type or the like), so allowing various data to be assigned to the gauge, for example one or more of the following items of data:

- a serial number of the gauge;
- the length of the electrodes;
- precalibration values;
- the type of gas contained in the container/bottle.

The programmable read-only memory is advantageously programmed to carry out capacitance measurement and supply a digital signal representing the level of gas or liquid in the container; this signal may for example be the measured capacitance value or, directly, a filling level. An electrical connector is preferably fitted at the upper part of the gauge and connected to the internal electrical circuit. The connector makes it possible to connect the gauge to a display module or to a computer system for processing and/or displaying the signal supplied by the gauge, or alternatively to a wireless signal transmission module. In the case of the display module, this may simply display a level indication, or be programmed to convert a capacitance value into a filling level.

The above variants and others are included in the appended dependent claims. According to another aspect of the present invention, the present level gauge may be combined with a valve, in one and the same body capable of being fitted in the opening of a pressurised container.

BRIEF DESCRIPTION OF THE DRAWINGS

Other distinctive features and characteristics of the invention will be revealed by the detailed description of some advantageous embodiments given below by way of example, with reference to the appended drawings, in which:

FIG. 2: shows a longitudinal section of the body module (alone) of the gauge of FIG. 1;

FIG. 3: shows a sectional view of the sealing gasket;

In the figures, the same reference signs denote identical or similar elements.

DETAILED DESCRIPTION OF A PREFERRED EMBODIMENT

The level gauge assembly according to the present invention is designed in such a way that the body constitutes a finished leakproof and operational module, to which it is sufficient to fix the electrodes to be able to install it on a container.

Figure 1:
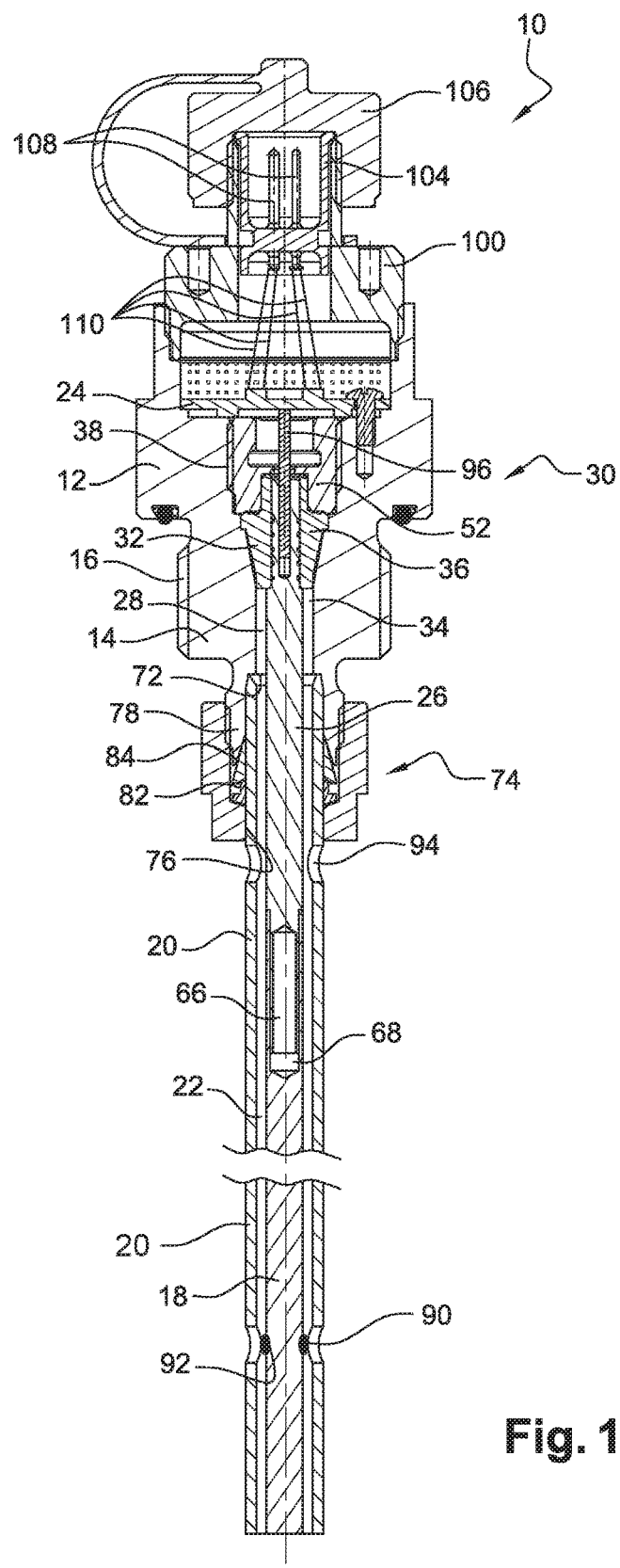
FIG. 1: shows a longitudinal section of an embodiment of the present capacitive level gauge.

A first embodiment of the present level gauge assembly (hereinafter also simply: the gauge) is illustrated in FIGS. 1 and 2. The gauge 10 comprises a body 12 with a lower part or base 14, capable of being fitted in an opening of said container (not shown). The body is generally of metallic material, for example of brass or any other appropriate metal or alloy. The base 14 is provided with an external thread 16 for fitting to the gas container (not shown), for example bottle, tank, etc.

A pair of capacitive electrodes, reference signs 18 and 20, are borne by the body 12 and dimensioned so as to extend over the height of the container, as desired over the entire height or over a predetermined height. As can be seen, there is a first, inner electrode 18, and a second, tubular electrode 20 surrounding the first electrode, an annular measurement space 22 being maintained therebetween. The electrodes 18 and 20 are preferably cylindrical/tubular in form and are fitted concentrically.

An electrical circuit 24 connected to the electrodes 18, 20 is preferably arranged in the body 12.

It will be appreciated that electrode-carrying means are fitted in leakproof manner in the body 12 and connected to the electrical circuit 24. The electrode-carrying means are configured to support fixedly the two electrodes 18, 20 with the measurement space 22 therebetween. The electrode-carrying means advantageously comprise a metallic support 26, preferably a metallic support rod, fitted in leakproof manner in the gauge body 12 and electrically insulated therefrom, the first electrode 18 being fixed to said metallic support, and the metallic support 26 being connected to the electrical circuit 24.

The electrode-carrying means are initially fitted in the body 12 in leakproof manner, and connected electrically. It is therefore sufficient to fix or couple to said means electrodes 18, 20 of the desired length, to make the gauge operational and ready to fit in a container. It is not necessary to test the leakproofness and/or functionality of the gauge 10 after fitting of the electrodes, since fitting thereof has no effect on the interior of the gauge body.

In the present embodiment, the body 12 comprises an internal through-passage 28, preferably extending from an orifice 29a situated in the end of the base 14 to another orifice 29b situated at the top part 30 of the body, which, in use, is located outside the container on which the gauge 10 is fitted.

The metallic support 26 is fitted by means of a gasket 32 which guarantees the absence of gas leaks downstream of this gasket 32. The gasket 32 further ensures electrical insulation of the metallic support 26 relative to the body 12.

In the variant illustrated in the figures, the passage 28 comprises, starting from the base 12, an upstream section 34 (high pressure side), then a transitional section 36, the diameter of which widens overall towards a downstream or low pressure section 38, accommodating inter alia the electrical circuit 24. The gasket 32 is positioned in the transitional zone 36 and has an external profile adapted to the variable section, for example frustoconical, of the transitional zone 36.

The gasket 32 comprises a central channel 40, preferably a through-channel, which receives a foot section 42 of the metallic support rod 26. Viewed in the axial direction, from the base 14, the gasket 32 comprises a first portion 44 flared in shape and interacting with the transitional section 36, then a second portion 46 forming a radial protrusion, and finally a cylindrical portion 48. The cylindrical portion 48 fits into a cavity 50 provided in a ring 52 which ensures retention and compression of the gasket 32, on the low pressure side. The ring 52 comprises external threading 54 which interacts with a corresponding screw thread 56 in the low pressure section 38. It will be noted that, since the central channel 40 of the gasket 32 is a through-channel, and that the rod foot 42 extends over the entire height of the channel 40, the support rod 26 is also held axially by the ring 52.

The geometries of the transitional section and of the gasket 32, and compression of the gasket 32 by the ring 52, ensure an impeccable absence of leaks. The ring 52 has a front surface 57, by which it rests on a rear shoulder 58 of the radial annular protrusion 46, and is screwed against a shoulder 60 of the downstream section 38. Under the stress of the ring 52, the conical walls of the gasket 32 are pressed against those of the transitional section 36. Furthermore, the radial protrusion 46, which comprises a front shoulder 62 at the base of the flared portion 44, is compressed axially against a corresponding shoulder 64 at the base of the transitional section 36.

The support rod 26 extends partially into the passage 28, in the region of the base 12, and beyond the lower end of the base 12. This allows easier access to the end 66 of the support rod 26 for fixing the inner electrode 18.

For the purposes of fitting, the free end 66 of the support rod 26 has been machined to form a bore therein which opens in the front face thereof, the central electrode 18 being designed to fit onto this tubular end 66. To this end, the central electrode 18 also comprises a hollow/tubular coupling portion 68, with an internal diameter corresponding substantially to the external diameter of the coupling end 66 of the support rod 26. Permanent coupling ensuring electrical continuity may be obtained by crimping (not shown) at the level of the overlapping tubular sections.

The outer electrode 20 is supported directly by the terminal part of the base 14. The passage 28 comprises, over its entry portion starting from the orifice 29a, a bore 70 capable of receiving the outer tubular electrode 20, abutting against a shoulder 72. The internal diameter of this entry portion corresponds substantially to the external diameter of the tubular electrode 20. Preferably, the tubular electrode 20 has an internal diameter substantially equal to that of the passage 28 downstream of the entry portion, and the support rod 26 has an external diameter substantially equal to that of the central electrode 18; thus, after fitting, geometric continuity is achieved and a constant measurement space 22 is obtained over the entire gauge height as far as the gasket 32.

Firm fixing of the tubular electrode 20 is advantageously achieved in the manner of a double ferrule fitting (or compression joint). A nut 74 comprising a cylindrical body 75 with orifice 76, the diameter of which is adapted to the passage, with fitting clearance, of the tubular electrode 20 is screwed onto the terminal part 78 of the base 14. The cylindrical body 75 of the nut 74 comprises a screw thread 80 which interacts with external threading 80' on the terminal part 78. Two rings 82 and 84 are arranged in the nut 74 and interact with a seat 86 surrounding the entry orifice 29a of the passage 28. The combination of the angles of the seat 86 and compression of the rings 82 and 84 ensures perfect anchoring of the electrode 20 over 3 generatrices. This is because, when the nut 74 is tightened, the pressure ring 82, pushed by the internal shoulder 88 of the nut 74, compresses and plastically deforms the conical ring 84, which bites into the outer surface of the tubular electrode 20. This makes it possible to obtain reliable, durable fixing, as well as very good vibration resistance. Such joints are known in the field and will not therefore be examined in any greater detail here.

To guarantee a constant measurement space 22, spacer parts 90, or struts, are preferably used, these being distributed over the height of the electrodes 18, 20.

In the variant of FIGS. 1 and 2, the internal electrode 18 is a solid rod (apart from the tubular connection part 68). In this case, the struts 90 take the form of annular gaskets or ring segments (i.e. open rings) which are preferably arranged in annular grooves 92 provided on the surface of the electrode 18. As will be understood, the use of ring segments 90 makes it possible to fit the strut directly at the desired height on the electrode rod 18, without having to slide it up the latter.

To allow fluid to enter the annular measurement space 22, orifices 94 are provided along the external tubular electrode 20, preferably a plurality of orifices for each zone between 2 consecutive struts 90. In order further to facilitate filling of the measurement zone 22, it is also possible to provide transverse holes in the central electrode 18.

Preferably, the electrodes 18, 20 and the metallic support 26 are made of a material which conducts electricity well, for example copper or a suitable alloy/metal. The struts are of synthetic, electrically insulating material, preferably of a dielectric strength greater than 60 KV·mm$^{-1}$, for example of PTFE or of Teflon® PFA resin well suited to injection. It will be noted that the use of struts made with fine tolerances guarantees precision of the measurement system.

The gasket 32 is also of synthetic material, with a dielectric strength suitable for guaranteeing a high level of galvanic insulation; PTFE or Teflon® PFA resin are possible examples.

Fixing the external electrode 20 to the gauge body 14 allows earthing thereof. The electrical circuit 24 preferably comprises a printed circuit board which is then connected electrically to the upper part 30 of the body 12, for example by means of a screw 95 also ensuring fixing thereof. A simple means is thereby achieved of ensuring electrical connection of the outer electrode 20. Furthermore, an electrical wire 96 connects the foot 42 of the support rod 26 to the electrical circuit 24.

The reference sign 98 indicates an overmolding resin covering the electrical circuit 24 and protecting it from external humidity and vibrations.

A cover 100 closes the downstream zone of the passage 28; it comprises an external thread 102 at its periphery, which engages with a screw thread 102' at the level of the orifice 29b.

The cover 100 preferably comprises an electrical connector 104 allowing connection of the gauge 10 to a display device or any other system capable of making use of the signal. A removable cap 106 protects the connector 104.

The present gauge 10 is preferably designed with a minimum level of onboard electronics. Level measurement or reading may be performed simply by connecting the gauge 10, via the connector 104, to a measurement and/or reading module capable of measuring the capacitance between the electrodes 18, 20 and/or converting the measurement signal into a level indication.

Preferably, the electrical circuit 24 comprises an EEPROM or another programmable read-only memory, so allowing various data, for example one or more of the following items of data, to be assigned to the gauge:
a serial number of the gauge;
the length of the electrodes;
precalibration values;
the type of gas contained in the container/bottle.

The EEPROM is preferably programmed to perform capacitive measurement, taking account, if applicable, of data stored in the EEPROM, and to supply a signal indicating the capacitance between the electrodes 18 and 20. In FIG. 1, the connector comprises four pins 108 (only two are visible) which are each connected by a wire 110 to the electrical circuit 24, two pins being used to supply power and two to carry a digital signal comprising an indicator of the fluid level in the container, in particular the capacitance value measured between the electrodes.

Level reading may be performed by means of a display module 112 (FIG. 5) programmed to convert the measurement signal into a level indication, which is indicated by a display 113.

Alternatively, the EEPROM in the body 12 may be programmed to supply a signal corresponding directly to a filling level value, for example a filling percentage, the display module then merely displaying this value.

Figure 5:
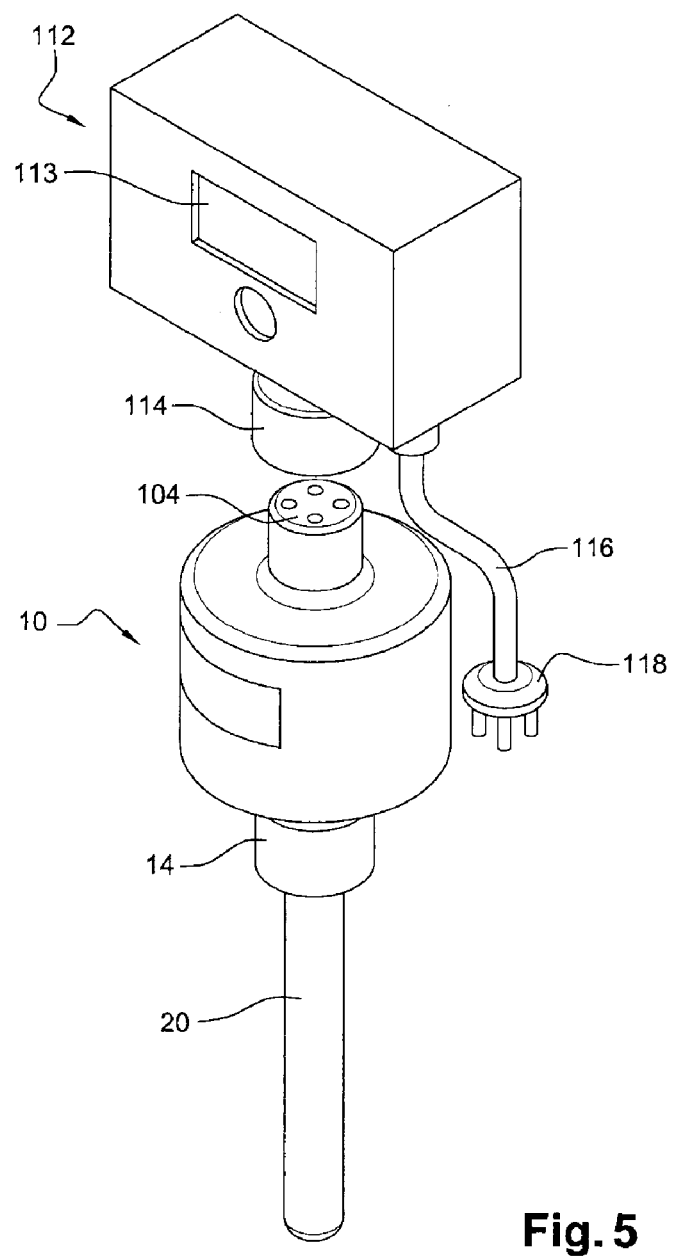
FIG. 5: shows a schematic diagram of the gauge assembly with a separate display module which may be connected to the gauge body.

As may be seen in FIG. 5, the display module 112 may comprise a connector 114 (here female) interacting with the connector 104, which allows the display module 112 to be fitted/electrically connected directly to the gauge 10. It is also possible to install the display module 112 further from the container, for example against a wall, connection then being effected by a cable 116, the end of which bears a connector 118 interacting with the gauge connector 104.

The display module may alternatively/also comprise any sort of device capable of wirelessly transmitting a signal indicating the level (capacitance value, percentage or other indication of filling level).

Finally, it would be possible simply to connect the gauge by cable, via the connector 104, to a network for processing the measurement/level signal using a computer system.

Figure 4:
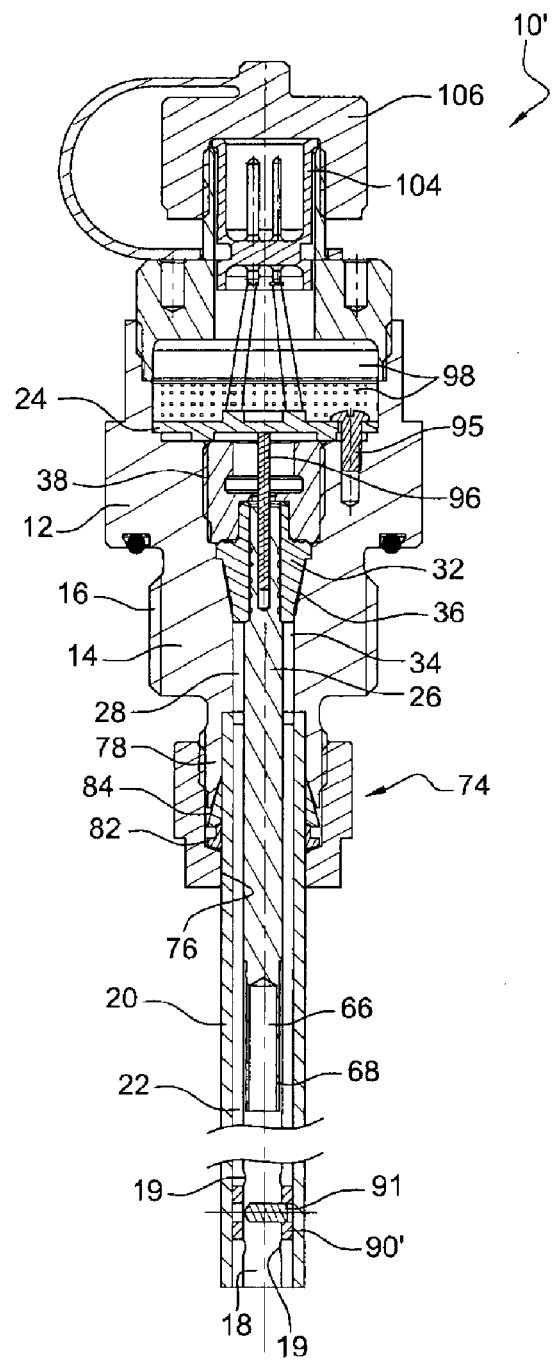
FIG. 4: shows a longitudinal section of another embodiment of the present capacitive level gauge.

FIG. 4 illustrates another embodiment of the present gauge 10', which is distinguished simply in that the inner electrode 18 is a tube (hollow). Such a geometry is therefore directly suitable for connection by crimping to the support rod 26. Furthermore, the fluid in the container may rise through the interior of the electrode 18, and holes 19 will then be provided in the electrode such that the fluid can pass through the wall thereof into the measurement space 22.

So as not to reduce locally the wall thickness of the electrode 18, this variant uses struts 90' in the form of ring segments of rectangular section with a peg 91 engaging in an orifice in the electrode tube 18. The strut is therefore simply a strip made into a round shape which extends over at least 75% of the periphery of the central electrode 18 and comprises on its inner face, facing the electrode 18, the peg 91.

In the variants presented herein the inner electrode 18 is fixed by crimping to its metallic support 26; it would however be possible to envisage any type of fixing suitable for joining two rod/tube ends, for example welding, screwing, or any other suitable mechanical coupling means.

The invention claimed is:

1. A capacitive level gauge assembly for a pressurised or liquefied gas container comprising:

a metallic body with a base structured to be fitted in an opening of a pressurised or liquefied gas container;

a pair of capacitive electrodes dimensioned to extend into the container, the pair of electrodes comprising a first inner electrode and a second tubular electrode surrounding the first inner electrode;

an electrical circuit arranged in the metallic body and connected to the pair of capacitive electrodes;

wherein electrode-carrying means are fitted in leak-proof manner in said body and connected to said electrical circuit, said electrode-carrying means being configured to support the pair of capacitive electrodes fixedly with an annular measurement space there-between, wherein the electrode-carrying means comprise a metallic support fitted in leak-proof manner in the metallic body and electrically insulated therefrom, the first inner electrode being fixed to said metallic support, and the metallic support being connected to the electrical circuit, wherein the body comprises an internal through-passage extending from an orifice in the base of the body to another orifice in an upper part of the body; the electrode-carrying means are arranged in a region of the base of the body, the metallic support of the first inner electrode being partially arranged in said through-passage, wherein the metallic support is held in the through-passage by means of a sealing gasket preventing gas from passing downstream of the sealing gasket, wherein the through-passage comprises a transitional section between an upstream and a downstream section, the transitional section being flared towards the downstream section; and the sealing gasket is arranged in the transitional section and has a flared portion, the sealing gasket further comprising an external profile of which is adapted to the transitional section, wherein the external profile is frustoconical, wherein the sealing gasket is compressed by a fitting part positioned in the downstream section and resting on a rear shoulder of the sealing gasket at the base of the flared portion, wherein the sealing gasket comprises, at an opposite end to the flared portion thereof, a cylindrical portion which engages in a cavity in the fitting part, wherein the fitting part is an externally threaded ring which cooperates with a screw thread in the downstream section, the externally threaded ring comprising a front face resting on the rear shoulder of the sealing gasket and on a shoulder of the downstream section, wherein the flared portion of the sealing gasket comprises a radial annular protrusion defining a second front shoulder resting on a shoulder at the base of the transitional section, and wherein the sealing gasket has a unitary structure and is made of a single material.

2. The capacitive level gauge assembly according to claim 1, wherein the first inner electrode is fixed to the metallic support by crimping, screwing or welding.

3. The capacitive level gauge assembly according to claim 2, wherein the metallic support comprises a tubular free end on which is fitted a tubular end of the first inner electrode, said ends being joined by crimping.

4. The capacitive level gauge assembly according to claim 1, wherein the sealing gasket comprises a channel which receives a foot portion of the metallic support, over the entire height of the gasket.

5. The capacitive level gauge assembly according to claim 4, wherein a conductive element connects the foot portion of the metallic support to the electrical circuit.

6. The capacitive level gauge assembly according to claim 1, wherein the base of the body comprises an end portion passed through by a through-passage and the second tubular electrode is inserted in the through-passage, abutting against a shoulder.

7. The capacitive level gauge assembly according to claim 6, wherein the second tubular electrode is held in position by clamping or friction.

8. The capacitive level gauge assembly according to claim 1, wherein the first inner electrode is solid or tubular, and in that insulating struts are distributed along the first inner electrode in order to maintain the annular measurement space.

9. The capacitive level gauge assembly according to claim 1, wherein the electrical circuit comprises a programmable read-only memory containing at least one of the following items of information: a serial number, length of the pair of capacitive electrodes, precalibration values, type of gas; and in that the memory is programmed to output a signal indicating a level of fluid in the container.

10. The capacitive level gauge assembly according to claim 1, further comprising a connector for supplying power to the electrical circuit and transmitting a signal indicating the level of fluid to a display module or a system capable of processing the signal, displaying the level of fluid, or a combination thereof.

11. The capacitive level gauge assembly according to claim 1, wherein the metallic support comprises at the free end thereof a coupling means suitable for fixing to the first inner electrode, cooperating with a coupling means at the end of the first inner electrode.

12. The capacitive level gauge assembly according to claim 1, wherein the metallic support is of an elongate cylindrical shape.

* * * * *